UNITED STATES PATENT OFFICE.

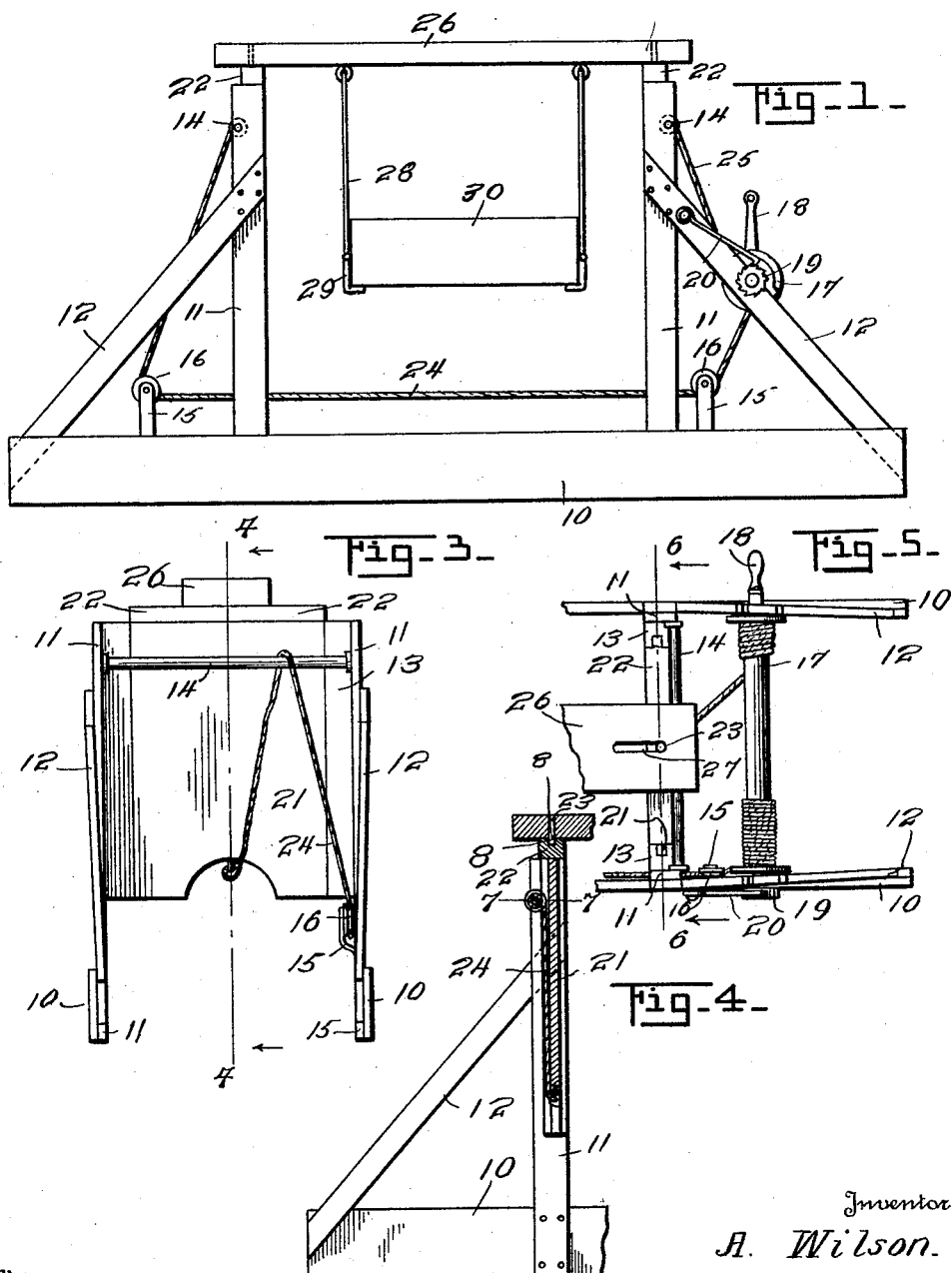

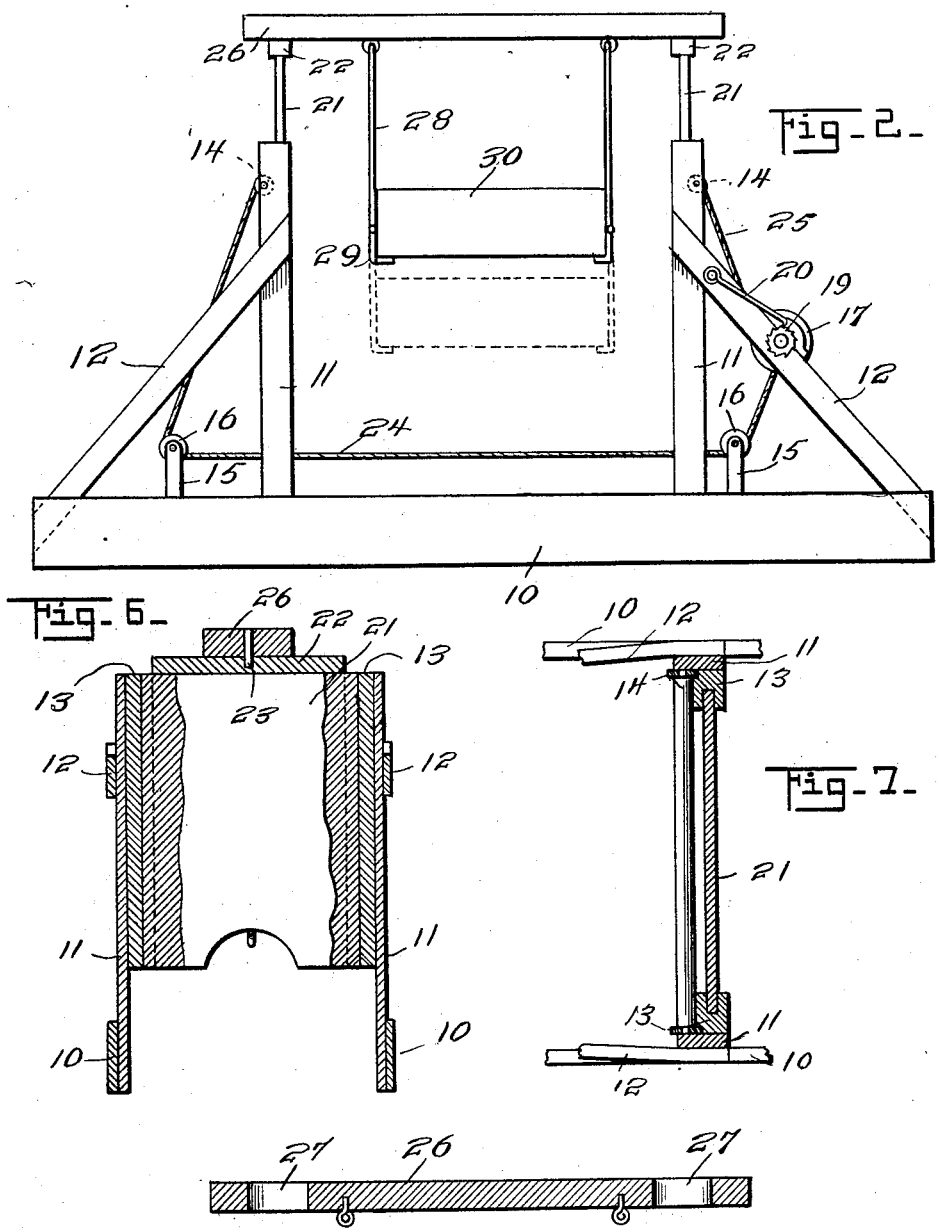

ALFRED WILSON, OF CORNING, CALIFORNIA.

HAY-RACK LIFTER.

1,116,964.  Specification of Letters Patent.  Patented Nov. 10, 1914.

Application filed April 14, 1914. Serial No. 831,794.

*To all whom it may concern:*

Be it known that I, ALFRED WILSON, a citizen of the United States, residing at Corning, in the county of Tehama, State of California, have invented certain new and useful Improvements in Hay-Rack Lifters; and I do hereby declare the following to be a full, clear, and exact description of the invention, such as will enable others skilled in the art to which it appertains to make and use the same.

This invention relates to improvements in lifting devices, and particularly to devices for lifting hay rack bodies.

The principal object of the invention is to provide a novel and effective device of this character whereby one man can easily raise a loaded hay rack body.

Other objects and advantages will be apparent from the following description, when taken in connection with the accompanying drawings.

In the drawings: Figure 1 is a side elevation of the device showing the hay rack body ready to be raised. Fig. 2 is a similar view showing the body raised. Fig. 3 is an end view. Fig. 4 is a vertical section on the line 4—4 of Fig. 3. Fig. 5 is a top plan view of a portion of the device. Fig. 6 is a vertical transverse sectional view on the line 6—6 of Fig. 5. Fig. 7 is a horizontal sectional view on the line 7—7 of Fig. 4. Fig. 8 is a vertical sectional detail view on the line 8—8 of Fig. 4.

Referring particularly to the accompanying drawings, 10—10 represent a pair of parallel base members which are disposed edgewise and have secured near their ends the vertical uprights 11. Connected to the uprights near their upper ends and to the end members 10 are the inclined braces 12. On the mutually adjacent faces of the oppositely disposed uprights are bearing blocks 13 in which are mounted the pulleys 14. Arranged adjacent one of the members 10 near the ends thereof are the standards 15 which carry the guide pulleys 16. Rotatably mounted in one of the pairs of inclined braces 12 is a transversely disposed winding drum 17 provided with a crank handle 18 on one end and a ratchet wheel 19 on the other, the latter being engaged by a pivotal pawl 20 mounted on one of said braces. In the upper ends of each of the pairs of uprights is mounted a block 21, on the upper end of which is a head 22 provided with a central vertical pin 23. Secured to the bottom of one of the blocks, and trained around the pulleys 13 and 16 is a cable 24, the other end of which is secured to and adapted to be wound on the drum 17. Secured to the bottom of the other plunger is a shorter cable 25 which is trained around the adjacent pulley 13, and has its other end also secured to and adapted to be wound on the drum 17, in the same direction. A beam 26 having a pair of slots 27, is disposed on the plunger, so that the pins 23 pass upwardly through the slots. Depending from the beam are the cables 28 which are provided with hook members 29 on the lower ends, for engagement with the hay rack body 30. The blocks 21 are adapted to move on the guides 13 up and down between the uprights according to the height of the wagon. Thus, when the hooks 29 are properly engaged with the wagon body, and the crank handle 18 turned, the cables 24 and 25 will be wound on the drum and cause the blocks and plunger to be moved vertically to lift the beam 26 and raise the wagon body from the running gear.

What is claimed is:

A wagon body lifter comprising base members, uprights secured to the base members, braces connecting the uprights and base members, vertically moving elements between the uprights, a winding drum, cables connected to the winding drum and to the vertically moving elements, said elements having central vertical pins on the upper ends thereof, and a beam having slots for the reception of the said pin members and carrying wagon body engaging members.

In testimony whereof, I affix my signature, in the presence of two witnesses.

ALFRED WILSON.

Witnesses:
 F. F. CROMLEY,
 FRANK COLLAR.

Copies of this patent may be obtained for five cents each, by addressing the "Commissioner of Patents, Washington, D. C."